US012777033B2

(12) United States Patent
Kukreja et al.

(10) Patent No.: US 12,777,033 B2
(45) Date of Patent: Oct. 27, 2026

(54) MEDIATOR SERVICE FOR CREDENTIAL ISSUANCE, VALIDATION, AND REVOCATION

(71) Applicant: Oracle International Corporation, Redwood Shores, CA (US)

(72) Inventors: Chuni Lal Kukreja, Delhi (IN); Ranjan Khanna, Minneapolis, MN (US); Kuldeep Bhupen Shah, Bengaluru (IN); Sreenivasa R. Chitturi, Prosper, TX (US)

(73) Assignee: Oracle International Corporation, Redwood Shores, CA (US)

( * ) Notice: Subject to any disclaimer, the term of this patent is extended or adjusted under 35 U.S.C. 154(b) by 19 days.

(21) Appl. No.: 19/172,292

(22) Filed: Apr. 7, 2025

(65) Prior Publication Data

US 2026/0312948 A1 Oct. 8, 2026

(51) Int. Cl.
*H04L 9/40* (2022.01)

(52) U.S. Cl.
CPC .......... *H04L 63/083* (2013.01); *H04L 63/107* (2013.01); *H04L 63/108* (2013.01)

(58) Field of Classification Search
CPC .... H04L 63/083; H04L 63/107; H04L 63/108
See application file for complete search history.

(56) References Cited

U.S. PATENT DOCUMENTS

| | | | | |
|---|---|---|---|---|
| 12,105,842 B1 * | 10/2024 | Dods | ........................ | G06F 17/18 |
| 12,306,994 B2 * | 5/2025 | Wilbert | ...................... | H04L 9/32 |
| 2026/0094151 A1 * | 4/2026 | Rao | .................... | G06Q 20/3823 |
| 2026/0100841 A1 * | 4/2026 | Cárdenes Cabré | .......................... | H04L 63/0807 |

* cited by examiner

*Primary Examiner* — Chau Le
*Assistant Examiner* — Jacob Benedict Knackstedt
(74) *Attorney, Agent, or Firm* — Invoke

(57) ABSTRACT

Techniques for validating credentials are disclosed. A system receives a request, submitted by a requestor via a graphical user interface (GUI) of a first device under control of the requestor, to validate one or more credentials of a credential holder. The system transmits, to the first device under control of the requestor, a unique link to present in the GUI of the first device. The system receives, via the unique link from a second device under control of the credential holder, the one or more credentials of the credential holder. Responsive to receiving the one or more credentials of the credential holder, the system determines if the one or more credentials of the credential holder are valid and notifies the requestor of a result of determining if the one or more credentials are valid.

20 Claims, 8 Drawing Sheets

MEDIATOR SERVICE FOR CREDENTIAL ISSUANCE, VALIDATION, AND REVOCATION

TECHNICAL FIELD

The present disclosure relates to credentials. In particular, the present disclosure relates to software-based approaches for validating credentials.

BACKGROUND

Many situations exist in which one may seek to validate an individual's affiliation with a particular entity. For example, employers and/or background check agencies may seek to validate an individual's current or past employment with a particular company. As another example, a potential employer or prospective university may seek to validate that a person attended or graduated from a particular institution. Some additional examples include but are not limited to: validating that somebody attended and/or graduated from a particular institution; validating professional licensure (e.g., by a medical board or bar association) and/or certification; validating membership in a particular club, union, or other association; validating affiliation with a particular agency or organization for security clearance; validating a medical provider's affiliation with a particular health care network or institution; or validating press credentials.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present disclosure.

1. GENERAL OVERVIEW
2. CREDENTIAL VALIDATION SYSTEM ARCHITECTURE
3. MACHINE LEARNING ARCHITECTURE
4. MACHINE LEARNING ENGINE OPERATIONS
5. VALIDATING CREDENTIALS OF A CREDENTIAL HOLDER USING VALIDATABLE CREDENTIALS
6. ISSUING VALIDATABLE CREDENTIALS
7. EXAMPLE OF CREDENTIAL VALIDATION OF SALESPERSON
8. PRACTICAL APPLICATIONS, ADVANTAGES & IMPROVEMENTS
9. HARDWARE OVERVIEW
10. MISCELLANEOUS; EXTENSIONS

1. GENERAL OVERVIEW

One or more embodiments validate a credential holder's credentials (e.g., employment status, academic status, etc.), in response to a request by a requestor (e.g., a potential customer, employer, business partner, etc.). The requestor uses a validation application to initiate the request. The requestor enters details of the validation request into the validation application. The validation application generates a unique link such as a quick-response (QR) code for the requestor to present to the credential holder. The credential holder scans the unique link provided by the requestor. The unique link directs the credential holder to an interface for submitting validatable credentials to a mediator service. The mediator service receives the request details and the validatable credentials from the credential holder. The mediator service then determines if the credentials are valid. The mediator service provides the validation results to the requestor. For example, the mediator service may push a notification of the results to the requestor's device. The mediator service may also notify the credential holder, for example, by pushing a notification to the credential holder's device.

One or more embodiments issue a validatable credential to a credential holder in response to receiving a request from a credential issuer such as an employer or university. For example, the credential holder may be an employee, current or former student, etc. A mediator service accesses a credential schema associated with the credential issuer, validates the credentials with the credential issuer, and generates the validatable credentials for the credential holder.

One or more embodiments monitor uses of a validatable credential to identify anomalous activity. For example, one or more embodiments may use machine learning techniques to detect anomalous activity associated with a validatable credential.

One or more embodiments described in this Specification and/or recited in the claims may not be included in this General Overview section.

2. CREDENTIALS VALIDATION SYSTEM ARCHITECTURE

Figure 1A:
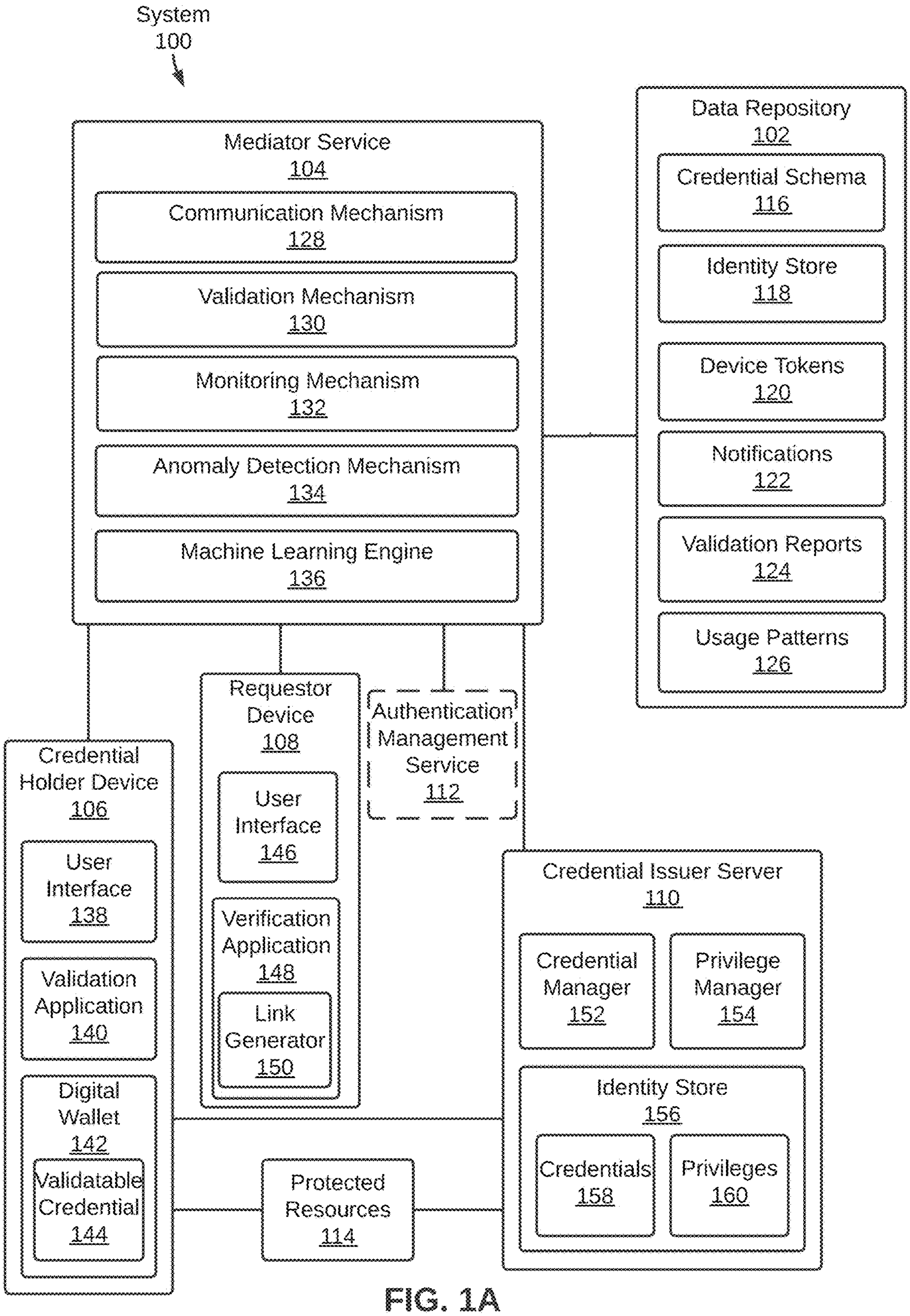
FIG. 1A illustrates a system in accordance with one or more embodiments.

FIG. 1A illustrates a system 100 in accordance with one or more embodiments. As illustrated in FIG. 1A, system 100 includes a data repository 102, a mediator service 104, a credential holder device 106, a requestor device 108, a credential issuer server 110, authentication management service 112, and protected resources 114. In one or more embodiments, the system 100 may include more or fewer components than the components illustrated in FIG. 1A. The components illustrated in FIG. 1A may be local to or remote from each other. The components illustrated in FIG. 1A may be implemented in software and/or hardware. Each component may be distributed over multiple applications and/or machines. Multiple components may be combined into one application and/or machine. Operations described with respect to one component may instead be performed by another component.

In one or more embodiments, data repository 102 is any type of storage unit and/or device (e.g., a file system, database, collection of tables, or any other storage mechanism) for storing data. Furthermore, data repository 102 may include multiple different storage units and/or devices. The multiple different storage units and/or devices may or may not be of the same type or located at the same physical site. Furthermore, data repository 102 may be implemented or executed on the same computing system as mediator service 104. Additionally, or alternatively, data repository 102 may be implemented or executed on a computing system separate from mediator service 104. Data repository 102 may be communicatively coupled with mediator service 104 via a direct connection or via a network.

Information describing validating credentials of a credential holder using validatable credentials may be implemented across any of components within the system 100. However, this information is illustrated within the data repository 102 for purposes of clarity and explanation.

In one or more embodiments, data repository 102 includes credential schema 116. Credential schema 116 is a framework or blueprint that defines the structure and attributes of a credential. Credential schema 116 specifies fields that the credential are required to include, a format of those fields, and any additional validation rules. Credential schema 116 ensures that the credentials are issued and presented in a consistent and predictable manner.

In one or more embodiments, credential schema 116 includes structure definition, data types, constraints, proof mechanism, and versioning. Structure definition details attributes that are included in the credential, e.g., name, age, qualification. A data type specifies a type of data that an attribute should hold, e.g., string, number, or date. Constraints define constraints or rules for the possible contents of fields. For example, an age field might require a numeric input that is greater than 18. Credential schema 116 can indicate how proofs of integrity and authenticity should be structured. For example, credential schema 116 may require the use of one or more particular digital signature algorithms. Credential schemas may be associated with version numbers, allowing them to evolve over time while still supporting credentials issued under older schemas.

In one or more embodiments, data repository 102 includes identity store 118. Identity store 118, also known as an identity repository or identity database, is a centralized system where digital identities are stored and managed. Identity store 118 stores credentials and privileges for credential holders associated with companies or organizations that utilize the mediator service 104. Identity store 118 may reconcile with identity store 156 of credential issuer on the credential issuer server 110 regularly to ensure that the credentials and privileges in identity store 118 are up-to-date.

In one or more embodiments, data repository 102 includes device tokens 120. Device tokens 120 are unique identifiers used to identify a specific device or instance securely. Device tokens 120 are used by push notification services, e.g., Apple Push Notification Service, Firebase Cloud Messaging, to transmit push notifications to devices of requestors and/or credential holders.

In one or more embodiments, data repository 102 includes notifications 122. Notifications 122 may be push notifications, text messages, emails, direct messages, phone calls, or the like. Notifications 122 are transmitted to one or more of the requestors or the credential holders, indicating that validation is complete. Notifications 122 may provide a link to a validation report. Alternatively, the validation report may be attached to or embedded within the notification.

In one or more embodiments, data repository 102 includes validation reports 124. Validation reports 124 are reports that accompany a notification from mediator service 104 that provide results of validating credentials of a credential holder. Validation report 124 may include details of the credential issuer, credential status, a timestamp, and a photograph of the credential holder. Credential status is a current status of the credential, e.g., active, expired, or revoked. Validation reports 124 may also provide privileges for the credential holder. Privileges may include a scope of authority possessed by the credential holder. Validation reports 124 may provide recommendations or instructions to the requestor for interacting with the credential holder. Validation reports 124 may provide disclaimers or warnings.

In one or more embodiments, data repository 102 includes usage patterns 126. Usage patterns 126 refer to how, when, and where credentials are submitted for validation by a credential holder. Usage patterns 126 may relate to timing of use, location of use, and/or user interaction. Timing of use refers to how often credentials are validated and times of day that the credentials are validated. Location of use refers to where the credentials are being presented, e.g., state, country, region. User interactions refer to how the credentials are presented for validation, including devices used, e.g., smartphone, computer, and behaviors of the credential holder.

In one or more embodiments, mediator service 104 refers to hardware and/or software configured to perform operations described herein for validating credentials of a credential holder using validatable credentials. Examples of operations for validating credentials of a credential holder using validatable credentials are described below with reference to FIGS. 3A and 3B.

In an embodiment, mediator service 104 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

In one or more embodiments, mediator service 104 includes communication mechanism 128. Communication mechanism 128 refers to hardware and/or software configured to perform operations described herein for handling communications between mediator service 104 and credential holder device 106, requestor device 108, credential issuer server 110, authentication management service 112, and protected resources 114. Communication mechanism 128 communicates with credential holder device 106 to receive the request to validate the credentials of the credential holder and the validatable credentials of the credential holder. Furthermore, communication mechanism 128 communicates with the requestor device 108 to provide a notification to the requestor of the results of validating the validatable credentials.

In one or more embodiments, validation mechanism 130 refers to hardware and/or software configured to perform operations described herein for validating the credentials of a credential holder using the validatable credentials presented by the credential holder. Validation mechanism 130 may also validate privileges of a credential holder.

In one or more embodiments, mediator service 104 includes monitoring mechanism 132. Monitoring mechanism 132 refers to hardware and/or software configured to perform operations described herein for monitoring changes to the credentials and/or privileges of a credential holder. After validating the credentials of a credential holder and providing notification to a requestor of the validity of the credentials, monitoring mechanism 132 periodically checks with the identity store to confirm the credential holder's credentials and/or privileges are still valid. In the event credentials and/or privileges are revoked, expired, or otherwise change, monitoring mechanism 132 may initiate a notification of the change to requestor. Mediator service 104 may use a push notification to notify the requestor when contact information for the requestor is not available.

In one or more embodiments, mediator service 104 includes anomaly detection mechanism 134. Anomaly detection mechanism 134 refers to hardware and/or software configured to perform operations described herein for detecting anomalies in usage patterns of a credential holder. Anomaly detection mechanism 134 may utilize one or more machine learning models for detecting the anomalies. Anomalies may include validation requests (i) from different countries in a short period of time, (ii) from an unknown device, and (iii) at unusual times.

In one or more embodiments, anomaly detection mechanism 134 utilizes various machine learning models to detect anomalous activity. Anomaly detection mechanism 134 may use anomaly detection models to detect deviations from normal credential usage. Anomaly detection mechanism 134 may use clustering models, e.g., K-Means, to group similar behaviors and detect outliers. Anomaly detection mechanism 134 may use classification models to predict whether a given credential usage pattern is legitimate or fraudulent. Anomaly detection mechanism 134 may use deep learning models to recognize complex patterns in large scale data. Anomaly detection mechanism 134 may use predictive maintenance models to forecast credential expiry and potential risks.

In one or more embodiments, the mediator service 104 includes machine learning engine 136. Machine learning engine 136 refers to hardware and/or software configured to perform operations described herein for training and applying machine learning models. Machine learning engine 136 will be described in detail with reference to FIG. 1B.

In one or more embodiments, credential holder device 106 includes a digital device, e.g., a smartphone, tablet, notebook or other device. Credential holder device 106 may include a user interface 138, a validation application 140, and a digital wallet 142.

In one or more embodiments, user interface 138 refers to hardware and/or software configured to facilitate communications between a credential holder and credential holder device 106. User interface 138 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In one or more embodiments, validation application 140 is an application that enables third parties, e.g., potential customer or potential employer, to validate credentials of a credential holder, e.g., salesperson or candidate. Validation application 140 may be loaded on the credential holder device 106 or accessed through a unique link provided by a requestor. Validation application 140 allows the credential holder to submit their validatable credentials 144 to mediator service 104. The credential holder may log in to the validation application 140 using traditional logins or VC-based authentication.

In one or more embodiments, validation application 140 allows the credential holder to set up automated validation triggers for recurring validation. Recurring validation may include periodic employment or enrollment checks. The recurring validation may be completed without manual intervention.

In one or more embodiments, digital wallet 142 refers to a software-based system for securely storing validatable credentials 144 on the credential holder device 106. Digital wallet 142 may transmit a validatable presentation of the credential when approved by the credential holder. Validatable credentials 144 may include identity credentials, professional credentials, education credentials, and access credentials. Identity credentials validate personal identity for logging into systems, accessing facilities, or crossing borders. Professional credentials provide professional qualifications, such as licenses or certifications. Educational credentials represent academic achievements, like degrees or diplomas. Access credentials are used to gain entry to systems, buildings, or networks. Validatable credentials 144 may be cryptographically protected.

In one or more embodiments, requestor device 108 includes a digital device, e.g., a smartphone, tablet, notebook, computer, or other device. Credential holder device 106 may include a user interface 146 and a validation application 148.

In one or more embodiments, user interface 146 refers to hardware and/or software configured to facilitate communications between a requestor and requestor device 108. User interface 146 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In one or more embodiments, validation application 148 is an application that facilitates validation of credentials of a credential holder. Validation application 148 may be the same or different from validation application 140 on credential holder device 106. Validation application 148 may provide a requestor with a selection of organizations from which a credential holder may be affiliated. Validation application 148 may provide a requestor with a selection of countries in which the credential holder may be operating.

Validation application 148 may provide a selection of credential types, e.g., employee status or student status.

In one or more embodiments, validation application 148 includes link generator 150. Link generator 150 refers to hardware and/or software configured to perform operations described herein for generating a link for presenting to a credential holder. Link generator 150 generates a unique link for presenting to the credential holder. The unique link may include identification of the organization from which the credential holder claims affiliation. The unique link may include device details of the requestor device 108 and a device token for the requestor device 108. The link generator 150 may embed a device token in the unique code generated by the link generator 150. Embedding a device token may include converting the token into a URL or a command that is then encoded into the requisite format. The unique link may be a 2-dimensional (2D) barcode, e.g., Quick Response (QR) code. 2D barcodes are designed to be scanned using an electronic device with a camera, e.g., smartphone or tablet. QR codes are a specific type of 2D barcode that includes black squares arranged in a square grid on a white background. Encoded in the QR code may be a URL, text, or other data. Scanning the QR codes directs a browser of a device used to scan the code to a specific web page or automatically connects with an application, e.g., validation application 140, on the device used to scan the code, e.g., credential holder device 106.

In one or more embodiments, validation application 148 includes a guest mode. In guest mode, a requestor is able to validate credentials of a credential holder without providing identifying information about the requestor. Notifications are provided to the requestor using push notifications to the requestor device 108. Alternatively, a requestor may log in to validation application 148 by providing personal identifying information, i.e., requestor contact information. The validation application 148 may receive a telephone number or email address associated with the requestor and relay the information to the mediator service 104. In this manner, the mediator service 104 may contact the requestor through text or email messages.

In one or more embodiments, credential issuer server 110 refers to hardware and/or software configured to serve as a centralized repository or application platform that provides services and resources to other computers, devices, or networks within the organization.

In one or more embodiments, credential issuer server 110 includes a credential manager 152. Credential manager 152 is hardware and/or software that stores and manages the validatable credentials issued by the credential issuer. Credential manager 152 may revoke, suspend, or otherwise change a status of validatable credentials 144. Credential manager 152 may communicate with identity store 118 of the mediator service 104 to ensure the validatable credentials of the credential holders are up-to-date.

In one or more embodiments, credential issuer server 110 includes a privilege manager 154. Privilege manager 154 may revoke, suspend, update, or change a status of privileges of a credential holder. Privilege manager 154 may communicate with identity store 118 of the mediator service 104 to ensure the privileges of the credential holders are up-to-date.

In one or more embodiments, credential issuer server 110 includes an identity store 156. Identity store 156 is a centralized system where digital identities are stored and managed. Identity store 156 stores credentials 158 and privileges 160 for credential holders associated with a company or organization that utilizes the mediator service 104. Credentials 158 are issued to agents of a company or organization. Credentials 158 identify the credential holder and the association of the credential holder to the credential issuer. Credentials 158 include validatable credentials. Privileges 160 define actions a credential holder is authorized to perform. For example, privileges for a door-to-door salesperson may include an ability to sell a product within a particular region.

In one or more embodiments, authentication management service 112 refers to hardware and/or software configured to function as an identity provider. Authentication management service 112 handles user authentication and provides identity tokens to other services, confirming an identity of a user. Authentication management service 112 may work independently from or in combination with mediator service 104 to validate credentials of a credential holder. Authentication management service 112 allows for credential validation across multiple identity providers and credential issuers.

In one or more embodiments, authentication management service 112 is an OpenID Connect (OIDC) server. OIDC is an identity authentication protocol built on top of open authorization (OAuth) 2.0. OIDC allows applications to verify a user's identity based on authentication performed by an authorization server and obtain user profile information in a secure manner.

In one or more embodiments, protected resources 114 refers to digital or physical assets that are subject to access controls and permissions to ensure that only authorized users or systems can access the resources. Protected resources 114 may include data, applications, services, physical spaces, and hardware.

3. MACHINE LEARNING ARCHITECTURE

Figure 1B:
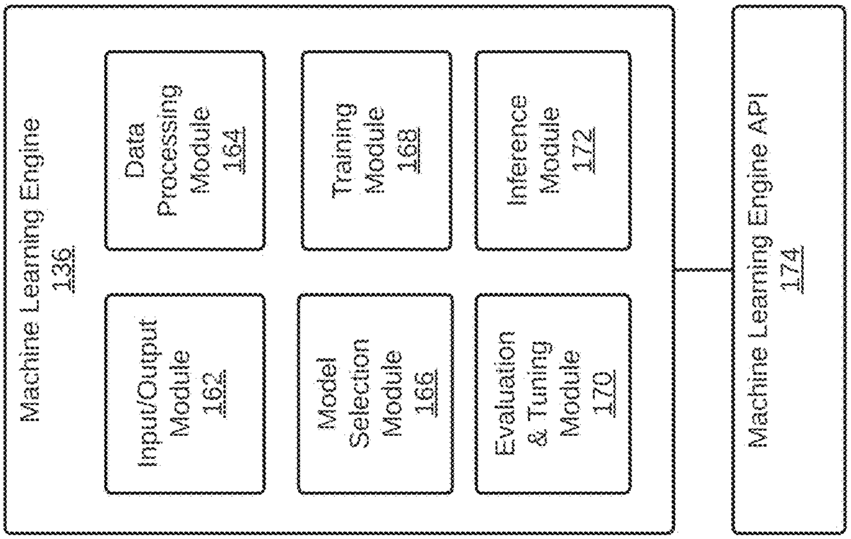
FIG. 1B illustrates a machine learning engine in accordance with one or more embodiments.

FIG. 1B illustrates a machine learning engine 136 in accordance with one or more embodiments. As illustrated in FIG. 1B, machine learning engine 136 includes input/output module 162, data preprocessing module 164, model selection module 166, training module 168, evaluation and tuning module 170, and inference module 172.

In accordance with an embodiment, input/output module 162 serves as the primary interface for data entering and exiting the system, managing the flow and integrity of data. This module may accommodate a wide range of data sources and formats to facilitate integration and communication within the machine learning architecture.

In an embodiment, an input handler within input/output module 162 includes a data ingestion framework capable of interfacing with various data sources, such as databases, APIs, file systems, and real-time data streams. This framework is equipped with functionalities to handle different data formats (e.g., CSV, JSON, XML) and efficiently manage large volumes of data. It includes mechanisms for batch and real-time data processing that enable the input/output module 162 to be versatile in different operational contexts, whether processing historical datasets or streaming data.

In accordance with an embodiment, input/output module 162 manages data integrity and quality as it enters the system by incorporating initial checks and validations. These checks and validations ensure that incoming data meets predefined quality standards, like checking for missing values, ensuring consistency in data formats, and verifying data ranges and types. This proactive approach to data quality minimizes potential errors and inconsistencies in later stages of the machine learning process.

In an embodiment, an output handler within input/output module 162 includes an output framework designed to handle the distribution and exportation of outputs, predictions, or insights. Using the output framework, input/output module 162 formats these outputs into user-friendly and accessible formats, such as reports, visualizations, or data files compatible with other systems. Input/output module 162 also ensures secure and efficient transmission of these outputs to end-users or other systems in an embodiment and may employ encryption and secure data transfer protocols to maintain data confidentiality.

In accordance with an embodiment, data preprocessing module 164 transforms data into a format suitable for use by other modules in machine learning engine 136. For example, data preprocessing module 164 may transform raw data into a normalized or standardized format suitable for training ML models and for processing new data inputs for inference. In an embodiment, data preprocessing module 164 acts as a bridge between the raw data sources and the analytical capabilities of machine learning engine 136.

In an embodiment, data preprocessing module 164 begins by implementing a series of preprocessing steps to clean, normalize, and/or standardize the data. This involves handling a variety of anomalies, such as managing unexpected data elements, recognizing inconsistencies, or dealing with missing values. Some of these anomalies can be addressed through methods like imputation or removal of incomplete records, depending on the nature and volume of the missing data. Data preprocessing module 164 may be configured to handle anomalies in different ways depending on context. Data preprocessing module 164 also handles the normalization of numerical data in preparation for use with models sensitive to the scale of the data, like neural networks and distance-based algorithms. Normalization techniques, such as min-max scaling or z-score standardization, may be applied to bring numerical features to a common scale, enhancing the model's ability to learn effectively.

In an embodiment, data preprocessing module 164 includes a feature encoding framework that ensures categorical variables are transformed into a format that can be easily interpreted by machine learning algorithms. Techniques like one-hot encoding or label encoding may be employed to convert categorical data into numerical values, making them suitable for analysis. The module may also include feature selection mechanisms, where redundant or irrelevant features are identified and removed, thereby increasing the efficiency and performance of the model.

In accordance with an embodiment, when data preprocessing module 164 processes new data for inference, data preprocessing module 164 replicates the same preprocessing steps to ensure consistency with the training data format. This helps to avoid discrepancies between the training data format and the inference data format, thereby reducing the likelihood of inaccurate or invalid model predictions.

In an embodiment, model selection module 166 includes logic for determining the most suitable algorithm or model architecture for a given dataset and problem. This module operates in part by analyzing the characteristics of the input data, such as its dimensionality, distribution, and the type of problem (classification, regression, clustering, etc.).

In an embodiment, model selection module 166 employs a variety of statistical and analytical techniques to understand data patterns, identify potential correlations, and assess the complexity of the task. Based on this analysis, it then matches the data characteristics with the strengths and weaknesses of various available models. This can range from simple linear models for less complex problems to sophisticated deep learning architectures for tasks requiring feature extraction and high-level pattern recognition, such as image and speech recognition.

In an embodiment, model selection module 166 utilizes techniques from the field of Automated Machine Learning (AutoML). AutoML systems automate the process of model selection by rapidly prototyping and evaluating multiple models. They use techniques like Bayesian optimization, genetic algorithms, or reinforcement learning to explore the model space efficiently. Model selection module 166 may use these techniques to evaluate each candidate model based on performance metrics relevant to the task. For example, accuracy, precision, recall, or F1 score may be used for classification tasks and mean squared error metrics may be used for regression tasks. Accuracy measures the proportion of correct predictions (both positive and negative). Precision measures the proportion of actual positives among the predicted positive cases. Recall (also known as sensitivity) evaluates how well the model identifies actual positives. F1 Score is a single metric that accounts for both false positives and false negatives. The mean squared error (MSE) metric may be used for regression tasks. MSE measures the average squared difference between the actual and predicted values, providing an indication of the model's accuracy. A lower MSE may indicate a model's greater accuracy in predicting values, as it represents a smaller average discrepancy between the actual and predicted values.

In accordance with an embodiment, model selection module 166 also considers computational efficiency and resource constraints. This is meant to help ensure the selected model is both accurate and practical in terms of computational and time requirements. In an embodiment, certain features of model selection module 166 are configurable such as a configured bias toward (or against) computational efficiency.

In accordance with an embodiment, training module 168 manages the 'learning' process of ML models by implementing various learning algorithms that enable models to identify patterns and make predictions or decisions based on input data. In an embodiment, the training process begins with the preparation of the dataset after preprocessing; this involves splitting the data into training and validation sets. The training set is used to teach the model, while the validation set is used to evaluate its performance and adjust parameters accordingly. Training module 168 handles the iterative process of feeding the training data into the model, adjusting the model's internal parameters (like weights in neural networks) through backpropagation and optimization algorithms, such as stochastic gradient descent or other algorithms providing similarly useful results.

In accordance with an embodiment, training module 168 manages overfitting, where a model learns the training data too well, including its noise and outliers, at the expense of its ability to generalize to new data. Techniques such as regularization, dropout (in neural networks), and early stopping are implemented to mitigate this. Additionally, the module employs various techniques for hyperparameter tuning; this involves adjusting model parameters that are not directly learned from the training process, such as learning rate, the number of layers in a neural network, or the number of trees in a random forest.

In an embodiment, training module 168 includes logic to handle different types of data and learning tasks. For instance, it includes different training routines for supervised learning (where the training data comes with labels) and unsupervised learning (without labeled data). In the case of deep learning models, training module 168 also manages the complexities of training neural networks that include initializing network weights, choosing activation functions, and setting up neural network layers.

In an embodiment, evaluation and tuning module 170 incorporates dynamic feedback mechanisms and facilitates continuous model evolution to help ensure the system's relevance and accuracy as the data landscape changes. Evaluation and tuning module 170 conducts a detailed evaluation of a model's performance. This process involves using statistical methods and a variety of performance metrics to analyze the model's predictions against a validation dataset. The validation dataset, distinct from the training set, is instrumental in assessing the model's predictive accuracy and its capacity to generalize beyond the training data. The module's algorithms meticulously dissect the model's output, uncovering biases, variances, and the overall effectiveness of the model in capturing the underlying patterns of the data.

In an embodiment, evaluation and tuning module 170 performs continuous model tuning by using hyperparameter optimization. Evaluation and tuning module 170 performs an exploration of the hyperparameter space using algorithms, such as grid search, random search, or more sophisticated methods like Bayesian optimization. Evaluation and tuning module 170 uses these algorithms to iteratively adjust and refine the model's hyperparameters—settings that govern the model's learning process but are not directly learned from the data—to enhance the model's performance. This tuning process helps to balance the model's complexity with its ability to generalize and attempts to avoid the pitfalls of underfitting or overfitting.

In an embodiment, evaluation and tuning module 170 integrates data feedback and updates the model. Evaluation and tuning module 170 actively collects feedback from the model's real-world applications, an indicator of the model's performance in practical scenarios. Such feedback can come from various sources depending on the nature of the application. For example, in a user-centric application like a recommendation system, feedback might comprise user interactions, preferences, and responses. In other contexts, such as predicting events, it might involve analyzing the model's prediction errors, misclassifications, or other performance metrics in live environments.

In an embodiment, feedback integration logic within evaluation and tuning module 170 integrates this feedback using a process of assimilating new data patterns, user interactions, and error trends into the system's knowledge base. The feedback integration logic uses this information to identify shifts in data trends or emergent patterns that were not present or inadequately represented in the original training dataset. Based on this analysis, the module triggers a retraining or updating cycle for the model. If the feedback suggests minor deviations or incremental changes in data patterns, the feedback integration logic may employ incremental learning strategies, fine-tuning the model with the new data while retaining its previously learned knowledge. In cases where the feedback indicates significant shifts or the emergence of new patterns, a more comprehensive model updating process may be initiated. This process might involve revisiting the model selection process, re-evaluating the suitability of the current model architecture, and/or potentially exploring alternative models or configurations that are more attuned to the new data.

In accordance with an embodiment, throughout this iterative process of feedback integration and model updating, evaluation and tuning module 170 employs version control mechanisms to track changes, modifications, and the evolution of the model, facilitating transparency and allowing for rollback if necessary. This continuous learning and adaptation cycle, driven by real-world data and feedback, helps to endure the model's ongoing effectiveness, relevance, and accuracy.

In an embodiment, inference module 172 transforms data raw data into actionable, precise, and contextually relevant predictions. In addition to processing and applying a trained model to new data, inference module 172 may also include post-processing logic that refines the raw outputs of the model into meaningful insights.

In an embodiment, inference module 172 includes classification logic that takes the probabilistic outputs of the model and converts them into definitive class labels. This process involves an analytical interpretation of the probability distribution for each class. For example, in binary classification, the classification logic may identify the class with a probability above a certain threshold, but classification logic may also consider the relative probability distribution between classes to create a more nuanced and accurate classification.

In an embodiment, inference module 172 transforms the outputs of a trained model into definitive classifications. Inference module 172 employs the underlying model as a tool to generate probabilistic outputs for each potential class. It then engages in an interpretative process to convert these probabilities into concrete class labels.

In an embodiment, when inference module 172 receives the probabilistic outputs from the model, it analyzes these probabilities to determine how they are distributed across some or every potential class. If the highest probability is not significantly greater than the others, inference module 172 may determine that there is ambiguity or interpret this as a lack of confidence displayed by the model.

In an embodiment, inference module 172 uses thresholding techniques for applications where making a definitive decision based on the highest probability might not suffice due to the critical nature of the decision. In such cases, inference module 172 assesses if the highest probability surpasses a certain confidence threshold that is predetermined based on the specific requirements of the application. If the probabilities do not meet this threshold, inference module 172 may flag the result as uncertain or defer the decision to a human expert. Inference module 172 dynamically adjusts the decision thresholds based on the sensitivity and specificity requirements of the application, subject to calibration for balancing the trade-offs between false positives and false negatives.

In accordance with an embodiment, inference module 172 contextualizes the probability distribution against the backdrop of the specific application. This involves a comparative analysis, especially in instances where multiple classes have similar probability scores, to deduce the most plausible classification. In an embodiment, inference module 172 may incorporate additional decision-making rules or contextual information to guide this analysis, ensuring that the classification aligns with the practical and contextual nuances of the application.

In regression models, where the outputs are continuous values, inference module 172 may engage in a detailed scaling process in an embodiment. Outputs, often normalized or standardized during training for optimal model performance, are rescaled back to their original range. This rescaling involves recalibration of the output values using the original data's statistical parameters, such as mean and standard deviation, ensuring that the predictions are meaningful and comparable to the real-world scales they represent.

In an embodiment, inference module 172 incorporates domain-specific adjustments into its post-processing routine. This involves tailoring the model's output to align with specific industry knowledge or contextual information. For example, in financial forecasting, inference module 172 may adjust predictions based on current market trends, economic indicators, or recent significant events, ensuring that the outputs are both statistically accurate and practically relevant.

In an embodiment, inference module 172 includes logic to handle uncertainty and ambiguity in the model's predictions. In cases where inference module 172 outputs a measure of uncertainty, such as in Bayesian inference models, inference module 172 interprets these uncertainty measures by converting probabilistic distributions or confidence intervals into a format that can be easily understood and acted upon. This provides users with both a prediction and an insight into the confidence level of that prediction. In an embodiment, inference module 172 includes mechanisms for involving human oversight or integrating the instance into a feedback loop for subsequent analysis and model refinement.

In an embodiment, inference module 172 formats the final predictions for end-user consumption. Predictions are converted into visualizations, user-friendly reports, or interactive interfaces. In some systems, like recommendation engines, inference module 172 also integrates feedback mechanisms, where user responses to the predictions are used to continually refine and improve the model, creating a dynamic, self-improving system.

4. MACHINE LEARNING ENGINE OPERATIONS

Figure 2:
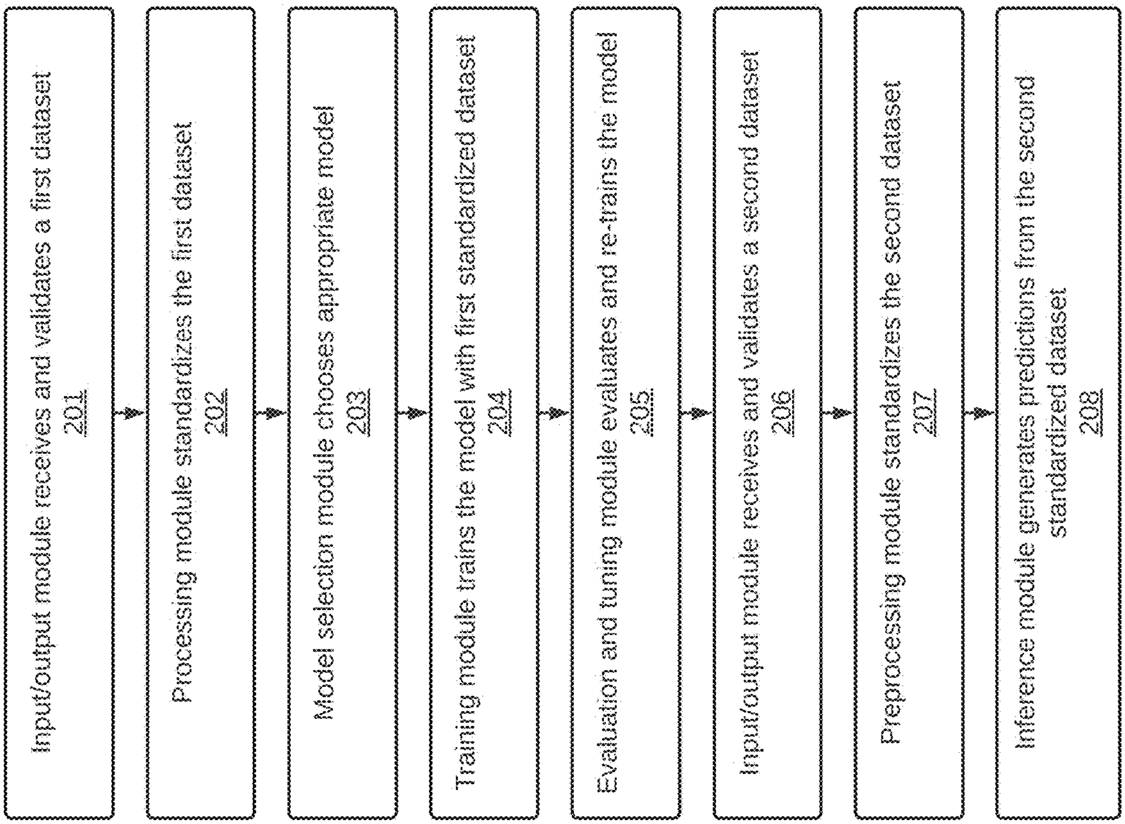
FIG. 2 illustrates an example set of operations for a machine learning engine.

FIG. 2 illustrates the operation of a machine learning engine in one or more embodiments. In an embodiment, input/output module 162 receives a dataset intended for training (Operation 201). This data can originate from diverse sources, like databases or real-time data streams, and in varied formats, such as CSV, JSON, or XML. Input/output module 162 assesses and validates the data, ensuring its integrity by checking for consistency, data ranges, and types.

In an embodiment, training data is passed to data preprocessing module 164. Here, the data undergoes a series of transformations to standardize and clean it, making it suitable for training ML models (Operation 202). This involves normalizing numerical data, encoding categorical variables, and handling missing values through techniques like imputation.

In an embodiment, prepared data from the data preprocessing module 164 is then fed into model selection module 166 (Operation 203). This module analyzes the characteristics of the processed data, such as dimensionality and distribution, and selects the most appropriate model architecture for the given dataset and problem. It employs statistical and analytical techniques to match the data with an optimal model, ranging from simpler models for less complex tasks to more advanced architectures for intricate tasks.

In an embodiment, training module 168 trains the selected model with the prepared dataset (Operation 204). It implements learning algorithms to adjust the model's internal parameters, optimizing them to identify patterns and relationships in the training data. Training module 168 also addresses the challenge of overfitting by implementing techniques, like regularization and early stopping, ensuring the model's generalizability.

In an embodiment, evaluation and tuning module 170 evaluates the trained model's performance using the validation dataset (Operation 205). Evaluation and tuning module 170 applies various metrics to assess predictive accuracy and generalization capabilities. It then tunes the model by adjusting hyperparameters, and if needed, incorporates feedback from the model's initial deployments, retraining the model with new data patterns identified from the feedback.

In an embodiment, input/output module 162 receives a dataset intended for inference. Input/output module 162 assesses and validates the data (Operation 206).

In an embodiment, data preprocessing module 164 receives the validated dataset intended for inference (Operation 207). Data preprocessing module 164 ensures that the data format used in training is replicated for the new inference data, maintaining consistency and accuracy for the model's predictions.

In an embodiment, inference module 172 processes the new data set intended for inference, using the trained and tuned model (Operation 208). It applies the model to this data, generating raw probabilistic outputs for predictions. Inference module 172 then executes a series of post-processing steps on these outputs, such as converting probabilities to class labels in classification tasks or rescaling values in regression tasks. It contextualizes the outputs as per the application's requirements, handling any uncertainty in predictions and formatting the final outputs for end-user consumption or integration into larger systems.

In an embodiment, machine learning engine API 174 allows for applications to leverage machine learning engine 136. In an embodiment, machine learning engine API 174 may be built on a RESTful architecture and offer stateless interactions over standard HTTP/HTTPS protocols. Machine learning engine API 174 may feature a variety of endpoints, each tailored to a specific function within machine learning engine 136. In an embodiment, endpoints such as /submitData facilitate the submission of new data for processing, while /retrieveResults is designed for fetching the outcomes of data analysis or model predictions. The MLE API may also include endpoints like /updateModel for model modifications and /trainModel to initiate training with new datasets.

In an embodiment, machine learning engine API 174 is equipped to support SOAP-based interactions. This extension involves defining a WSDL (Web Services Description Language) document that outlines the API's operations and the structure of request and response messages. In an embodiment, machine learning engine API 174 supports various data formats and communication styles. In an embodiment, machine learning engine API 174 endpoints may handle requests in JSON format or any other suitable format. For example, machine learning engine API 174 may process XML, and it may also be engineered to handle more compact and efficient data formats, such as Protocol Buffers or Avro, for use in bandwidth-limited scenarios.

In an embodiment, machine learning engine API 174 is designed to integrate WebSocket technology for applications necessitating real-time data processing and immediate feedback. This integration enables a continuous, bi-directional communication channel for a dynamic and interactive data exchange between the application and machine learning engine 136.

5. VALIDATING CREDENTIALS OF CREDENTIAL HOLDER USING VALIDATABLE CREDENTIALS

Figure 3A:
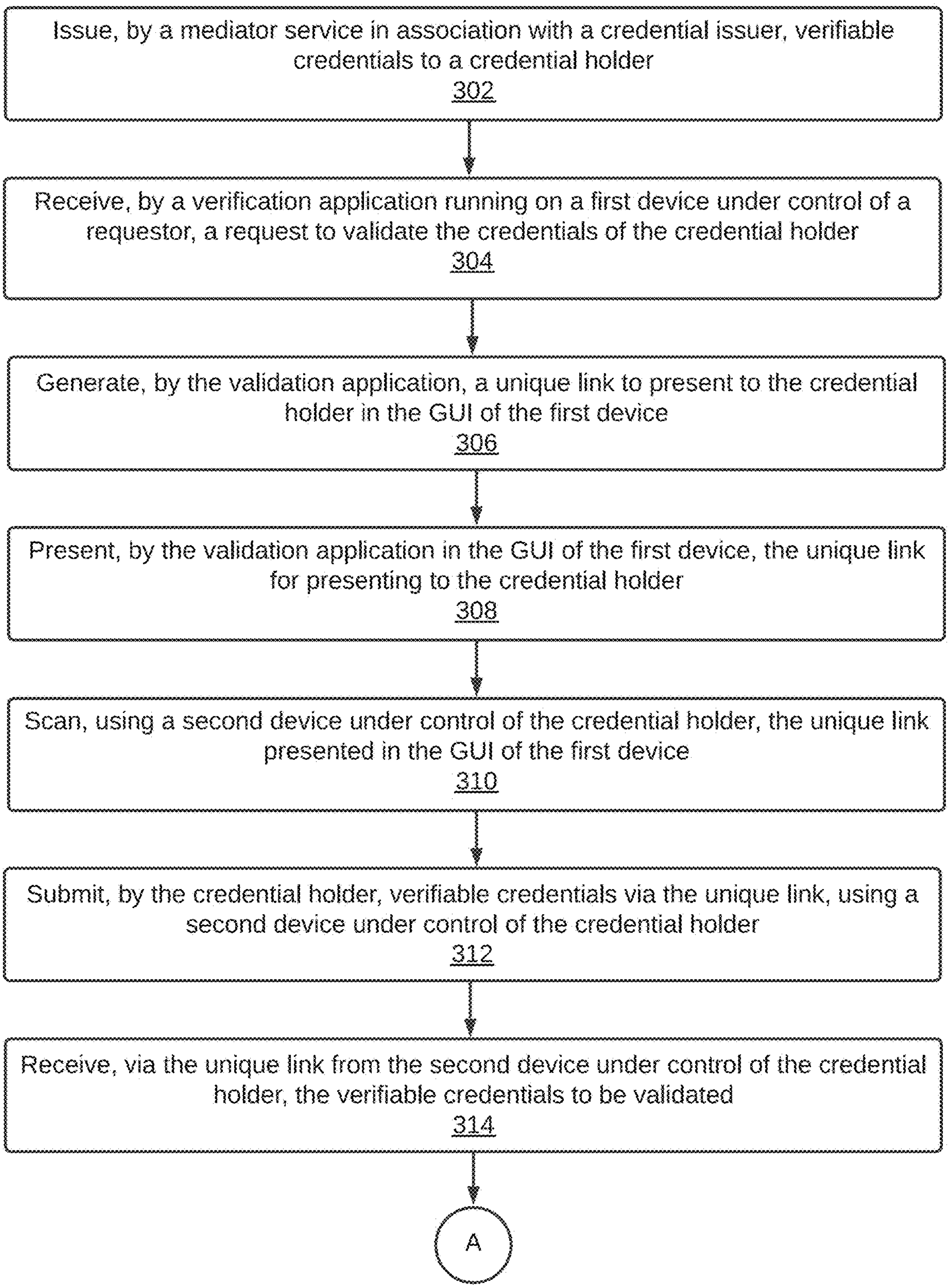
FIGS. 3A and 3B illustrate an example set of operations for validating credentials using validatable credentials in accordance with one or more embodiments.
Figure 3B:
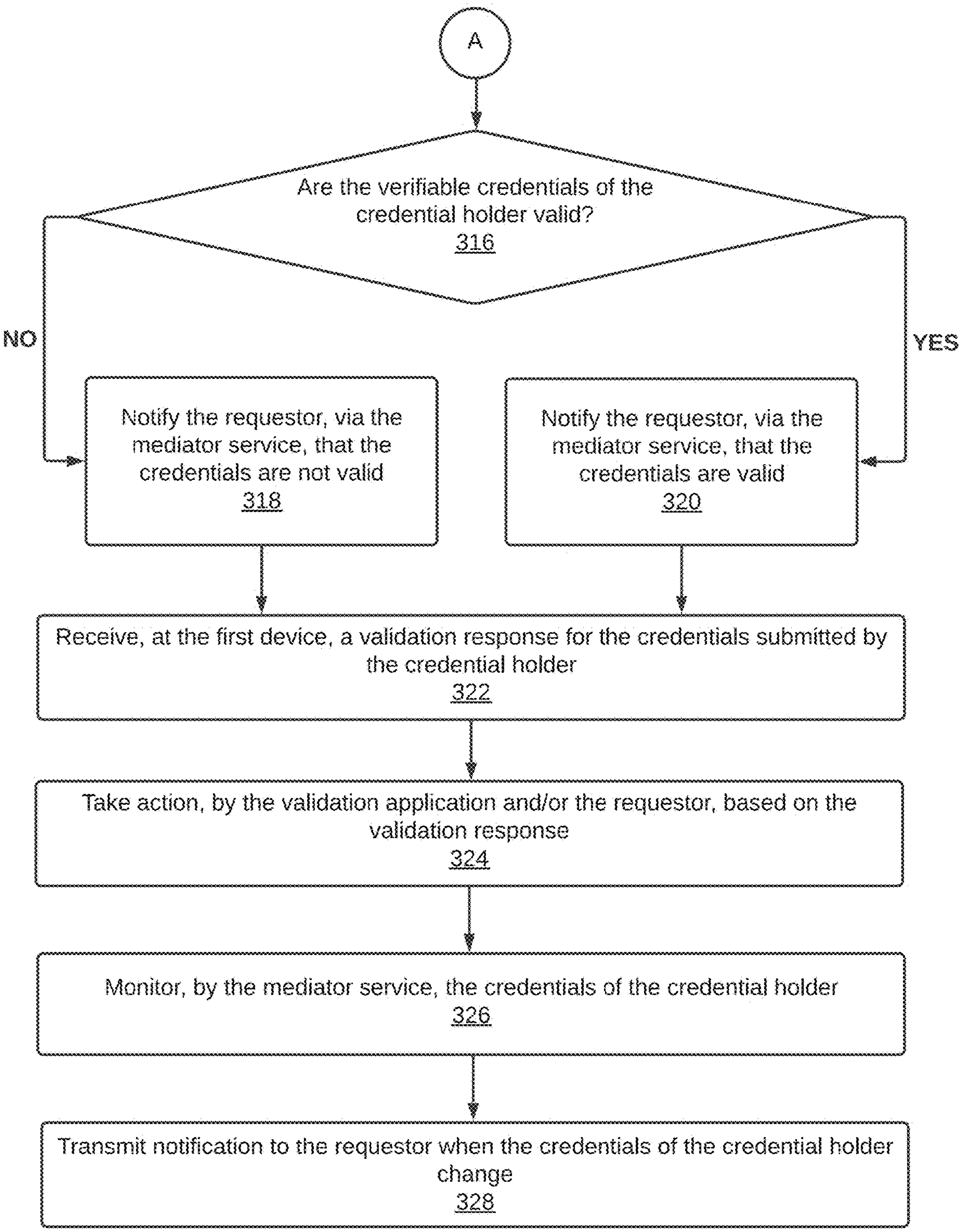

FIGS. 3A and 3B illustrate an example set of operations for validating credentials of a credential holder using validatable credentials in accordance with one or more embodiments. One or more operations illustrated in FIGS. 3A and 3B may be modified, rearranged, or omitted. Accordingly, the particular sequence of operations illustrated in FIGS. 3A and 3B should not be construed as limiting the scope of one or more embodiments.

One or more embodiments issue, by a mediator service in association with a credential issuer, validatable credentials to a credential holder (Operation 302). The mediator service provides credential issuers, e.g., companies, universities, a process for issuing cryptographically protected VCs for employees, students, or any individuals requiring credentials. The credential issuance process may be integrated with an identity store of the credential issuer, ensuring that any credential issued is reconciled with the credential issuer's data and schema/definition stored in the mediator service. An example of operations for issuing a validatable credential is described below with reference to FIG. 4.

In one or more embodiments, a credential issuer, e.g., company or university, submits a request to the mediator service to issue a validatable credential for a user. The mediator service checks the credential schema and user attributes stored in an identity store maintained by the mediator service. The identity store maintained by the mediator service may be reconciled with an identity store of the credential issuer. Reconciling the identity stores reduces the possibility of identity spoofing during issuing of the validatable credentials. Once validated, the validatable credential is issued to the credential holder and stored in a digital wallet of the credential holder.

In one or more embodiments, an organization, e.g., company or institution, issues a validatable credential to an employee or a student via an identity provider, e.g., OIDC. Processes for issuing validatable credentials may vary by identity provider. For example, an employer may initiate a request to an identity provider for validatable credentials through an application. The request may be initiated after the authentication of the employee by the employer. The identity provider may present the employee with a request for consent to issue the validatable credentials. Upon receiving employee consent, the identity provider may generate a validatable credential that is delivered to the employee and is stored in a digital wall or similar tool on the employee's device.

In one or more embodiments, when a validatable credential is issued through the mediator service, the validatable credential is enrolled into an AI monitoring system. An AI agent of the AI monitoring system tracks metadata related to the credential use. Metadata that is tracked may include geographic location, frequency of use, time of day of use, and device information.

In an embodiment, a validation application executing on a device under control of a requestor, hereinafter the "requestor device," receives a request to validate the credentials of the credential holder (Operation 304). The requestor launches a validation application on the requestor device. The requestor device may download the validation application from an app store or a website. The requestor may interact with the validation application as a guest or may create an account with the validation application. By creating an account and providing contact information, e.g., email address, phone number, the validation application may communicate with the requestor outside of push notifications.

In one or more embodiments, the requestor initiates a request by opening the application and providing request details. The request details may include a current location of the requestor. The current location may include an address, GPS coordinates, or a region, e.g., county, state, country. The current location may be entered into a text box of the validation application or by selecting a location from a list of possible locations, e.g., a dropdown menu of possible regions. A location mechanism associated with requestor device may provide a suggestion for the location. The request details may include a credential issuer, i.e., company or institution, of validatable credentials of the credential holder. The requestor may select the credential issuer from a list of possible credential issuers. The list of possible credential issuers may be filtered based on the location provided by the requestor. The request details may include a credential type, e.g., employee or student status, of the credential holder. The requestor may select request details from a list of credential types.

In one or more embodiments, when the requestor is unable to find the credential issuer for the credential holder in the list of credential issuers available in the validation application, the requestor uses a credential type-based validation process.

In one or more embodiments, when a credential holder attempts to access a protected resource of an organization, the organization initiates a VC-based authentication request through the mediator service.

One or more embodiments generate, by the validation application, a unique link to present to the credential holder in the GUI of the requestor device (Operation 306). The validation application on the requestor device uses the request details provided by the requestor and device details of the requestor device to generate a unique link. The request details include a current location, the credential issuer, i.e., the organization with which the credential holder asserts affiliation, and the credential type. When the organization is not listed in the validation application, the details of the credential holder may include the current location and the credential type without providing an organization. The device details may include a device token for the requestor device. Alternatively, the unique link may include requestor details embedded in the link. Requestor details may include a user name registered with the mediator service or contact information, e.g., telephone number, email address, of the requestor.

One or more embodiments present, by the validation application in the GUI of the requestor device, the unique link for presenting to the credential holder (Operation 308). The credential holder may log in to the validation application using traditional logins or VC-based authentication. When the credential holder is in the presence of the requestor, the requestor may present the unique link directly to the credential holder in the GUI of the validation application. When an interaction between the requestor and the credential holder is virtual, the requestor may present the unique link in the video stream to the credential holder. Alternatively, the requestor may transmit the unique link to the credential holder device via text message, email, direct message, or in any other manner.

One or more embodiments scan, using a second device under control of the credential holder hereinafter, the credential holder device, the unique link presented in the GUI of the first device (Operation 310). When the requestor and the credential holder are colocated, the credential holder may scan the unique link using the credential holder device. Similarly, when the unique link is presented in a video stream with the requestor, the credential holder may use the credential holder device to scan the unique code. In instances when the unique link is sent to the credential holder by the requestor, the credential holder may click on or otherwise interact with the unique link to continue the validation process.

In one or more embodiments, when a credential holder attempts to access a protected resource of the credential issuer, the credential issuer initiates a validation request through the mediator service. The mediator service may provide a push notification to a device of the credential holder. The push notification may prompt the credential holder to provide their validatable credentials.

One or more embodiments submit, by the credential holder, validatable credentials via the unique link, using a second device under control of the credential holder (Operation 312). Using the credential holder device, the credential holder scans or otherwise engages the unique link. Scanning the unique link may launch a validation application on the credential holder device that prompts the credential holder to provide their validatable credentials. Alternatively, scanning the unique link may access a website or otherwise prompt the credential holder to provide their validatable credentials. The prompt may request consent from the credential holder to continue the validation process. The validatable credential of the credential holder may be retrieved from a digital wallet of the credential holder on the credential holder device. After the credential holder consents to the validation process, the validation application submits the validatable credentials to the mediator service for validation. The digital wallet of the credential holder device may transmit the validatable credentials to the mediator service. The digital wallet may transmit the validatable credential as a validatable presentation. The validation application also provides the mediator service with the request details that were included in the unique link.

In one or more embodiments, when the credential holder attempts to access a protected resource of the organization, the mediator service transmits a push notification to the digital wallet of the credential holder. The push notification sent to the digital wallet of the credential holder prompts the credential holder to present their validatable credentials. The prompt may include a link for sending the validatable credentials to the mediator service. The prompt may include an interface element for consenting to the validation. The credential holder may confirm consent for the validation process and submit their validatable credentials via the credential holder device.

One or more embodiments receive, via the unique link from the second device under control of the credential holder, the validatable credentials to be validated (Operation 314). After the credential holder consents to the validation process and submits the validatable credentials for validation, the mediator service receives the validatable credential and the request details, including the requestor details. The requestor details allow the mediator service to communicate with the requestor. Requestor details may include a device token for the requestor device or identifying information of the requestor.

One or more embodiments confirm validity of the validatable credentials of the credential holder (Operation 316). The mediator service may query an identity store of the credential issuer to ensure the validity of the credential. When querying the identity store, the mediator service may check attributes, such as employment status or academic status, of the credential holder. The integration of the mediator service with the identity store of the credential issuer allows the mediator service to detect any revocation or suspension of credentials based on real-time updates.

When the validation request is credential-type based, one or more embodiments submit the validatable credentials to an authentication management service, e.g., OIDC server, to be validated. The mediator service receives notification from the authentication management service of the validity of the validatable credentials.

In one or more embodiments, when accessing the protected resource of the organization and after submitting their validatable credentials for validation, once the validatable credential is validated, the credential holder gains access to the protected resource.

In one or more embodiments, as the credential is used, an artificial intelligence (AI) agent of an AI monitoring system analyzes context of the usage of the validatable credential. The AI agent checks for consistency with typical behavior of the credential holder. When anomalous activity is detected, e.g., credentials being used in multiple countries or from unfamiliar devices within a short timeframe, the AI agent may prevent validation of the credentials or flag the credential holder for further inspection. The AI agent may also notify the credential issuer of potentially fraudulent activity.

In an embodiment, responsive to determining that the credentials are not valid, the mediator service notifies the requestor that the credentials are not valid (Operation 318). The notification may be in the form of a push notification. The notification may include a validation report. The credential holder may also receive a notification.

In an embodiment, responsive to determining that the credentials are valid, the mediator service notifies the requestor that the credentials are valid (Operation 320). The notification may include a push notification. The notification may include a validation report. The credential holder may also receive a notification.

One or more embodiments receive, at the first device, a validation response for the credentials submitted by the credential holder (Operation 322). The requestor device may receive the validation response as a push notification. Alternatively, the requestor device may receive the validation response as an e-mail, text message, direct message, or phone call. The notification may include a validation report. The notification may include a color coding, e.g., red for invalid credentials or green for valid credentials, and/or other visual indicator, such as a large "X" for invalid credentials or a large checkmark for valid credentials. The notification may also include an audible indicator, e.g., ding or siren, representing valid or invalid credentials. The notification that the credentials of the credential holder are not valid may include warnings or other alerts. When validation results in the credentials are found to be invalid, the notification may include a mechanism, e.g., interface element, for contacting law enforcement.

In an embodiment, the validation application and/or the requestor take(s) action based on the validation response (Operation 324). In the event the validation response confirms the validity of the credentials, the requestor may continue interacting with the credential holder. Taking action may include listening to a presentation by the credential holder, making a purchase from the credential holder, and/or allowing the credential holder access to a facility or protected resources. Action taken by the requestor when the credentials are returned as invalid may include discontinuing interaction with the credential holder and/or notifying law enforcement of the credential holder misrepresenting themselves.

In one or more embodiments, the validation application includes an option for revalidating the credentials of the credential holder at a later time. In instances where the requestor may have subsequent interactions with the credential holder, the requestor may initiate a revalidation of the credentials of the credential holder directly with the mediator service without requiring action by the credential holder.

In one or more embodiments, the mediator service monitors the credentials of the credential holder (Operation 326). The mediator service may monitor the credentials of the credential holder periodically or continuously. When the identity store of the mediator service is reconciled with the identity store of the credential issuer, the mediator service may confirm that the status of the credentials of the credential holders that have been validated by the mediator service have not changed. A change in status may include revocation or expiration.

One or more embodiments transmit a notification to the requestor when the credentials of the credential holder change (Operation 328). When the status of the credentials of the credential holder change, the mediator service may notify the requestor by transmitting a push notification to the requestor device. Alternatively, the mediator service may notify the requestor via email, text messages, direct message, or call. The mediator service may notify a requestor of a change in status of the credentials of the credential holder that occurs within a set period of time, e.g., day, week, month. The period of time for providing an update on the status of the credentials of a credential holder may vary depending on the type of interaction between the requestor and the credential holder, e.g., one-time or reoccurring interactions. For example, a door-to-door salesperson may have a single interaction with the requestor, while a loan officer may have multiple interactions with the requestor.

6. ISSUING VALIDATABLE CREDENTIALS

Figure 4:
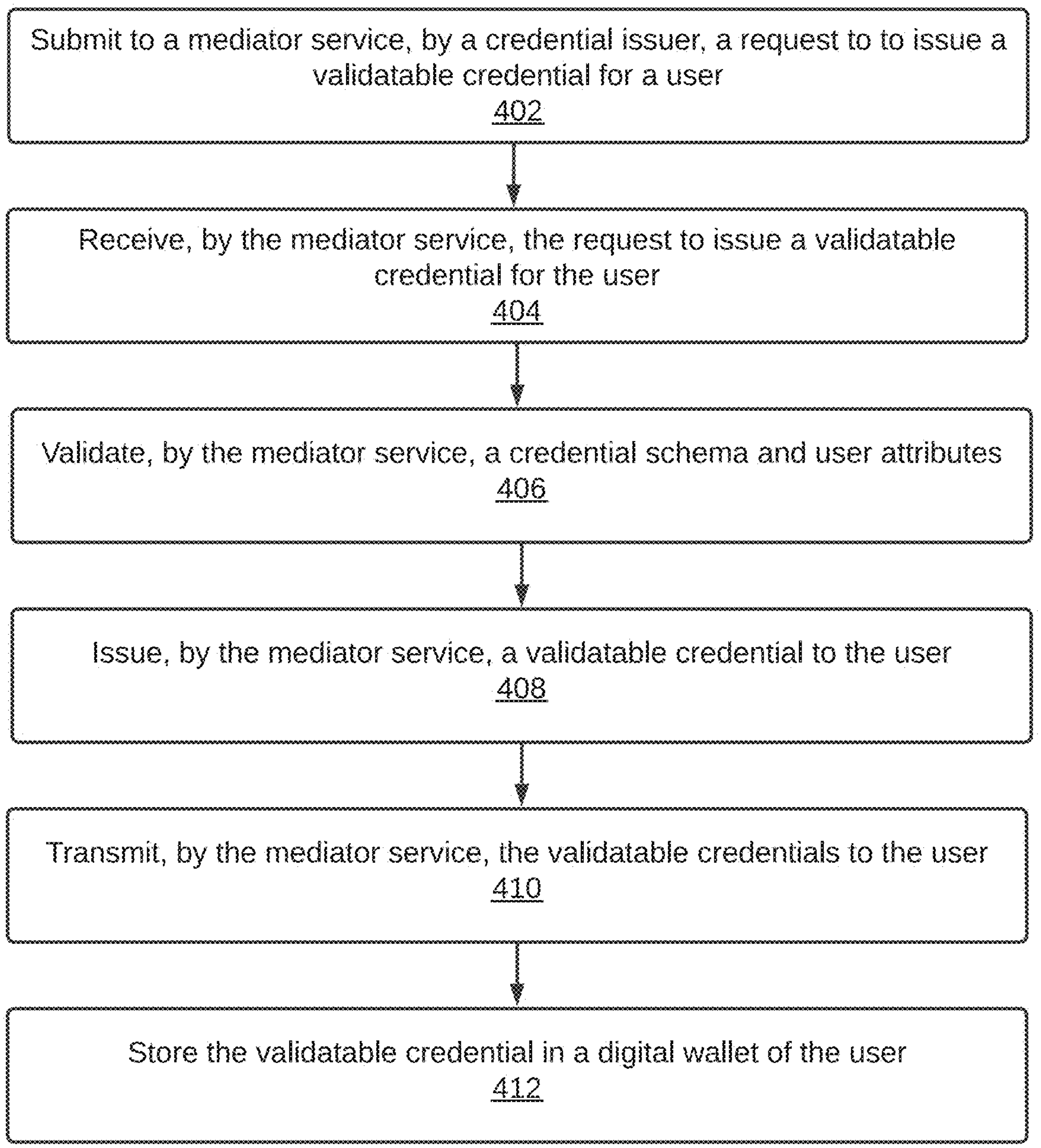
FIG. 4 illustrates an example set of operations for issuing validatable credentials in accordance with one or more embodiments.

FIG. 4 illustrates an example set of operations for issuing validatable credentials by a mediator service to a user in accordance with one or more embodiments. One or more operations illustrated in FIG. 4 may be modified, rearranged, or omitted. Accordingly, the particular sequence of operations illustrated in FIG. 4 should not be construed as limiting the scope of one or more embodiments.

In one or more embodiments, a credential issuer submits, to a mediator service, a request to issue a validatable credential for a user (Operation 402). The credential issuer collects information from the user including, for example, personal details, identity documents, dimetric data, etc. The credential issuer may verify the collected information through internal checks and/or external verification services to ensure accuracy and authenticity. The credential issuer may initiate the request for the mediator service to issue a validatable credential for the user through an application or an API of the mediator service. To help ensure privacy and security, the credential issuer may encrypt the user's data before transmitting the user's data to the mediator service. The request to issue a validatable credential may include the user's verified information and may specify a type of credential being requested. The request may also include a purpose and any specific attributes that the credential should include.

In one or more embodiments, the mediator service receives the request to issue a validatable credential for the user (Operation 404). The mediator service may receive the request through an application or via an API of the mediator service. The submission may include secure authentication to verify the credential issuer's identity to the mediator.

In one or more embodiments, the mediator service validates a credential schema and user attributes (Operation 406). Upon receipt of the credential schema and the user attributes, the mediator service reviews the request to confirm that the request meets applicable criteria, complies with relevant standards, and/or complies with applicable laws, e.g., relating to data protection. The mediator service may check the credential schema and user attributes against the credential schema and user attributes stored in the identity store of the mediator services. The mediation service may reconcile its identity store with the credential issuer's identity store. Once approved, the mediator service creates a digital credential, i.e., validatable credential, that may be transmitted to the user.

In one or more embodiments, the mediator service issues a validatable credential to the user (Operation 408). After validating the identity and eligibility of the user, the mediator service creates the validatable credential. This involves embedding the necessary attributes and data as defined by the credential schema. The mediator service may digitally sign the validatable credential using secure cryptographic techniques. The signature validates the authenticity and integrity of the validatable credential.

In one or more embodiments, the mediator service transmits the validatable credential to the user (Operation 410). To protect the validatable credential during transmission, the validatable credential may be encrypted using encryption standards. This ensures that the credential data cannot be intercepted and misused by unauthorized parties. The mediator services may transmit the validatable credential over secure channels, e.g., HTTPS, VPNs, or other encrypted communication paths, to minimize risk of interception of the validatable credential.

One or more embodiments store the validatable credential in the user's digital wallet (Operation 412). The user may receive the transmitted validatable credential in a digital wallet or similar secure storage method accessible or manageable by the user. Upon receiving the validatable credential, the digital wallet and/or a validation application may verify the issuer's signature using public cryptographic keys to confirm the authenticity of the validatable credential.

7. EXAMPLE OF CREDENTIAL VALIDATION SALESPERSON

A detailed example is described below for purposes of clarity. Components and/or operations described below should be understood as one specific example that may not be applicable to certain embodiments. Accordingly, components and/or operations described below should not be construed as limiting the scope of any of the claims.

Figure 5A:
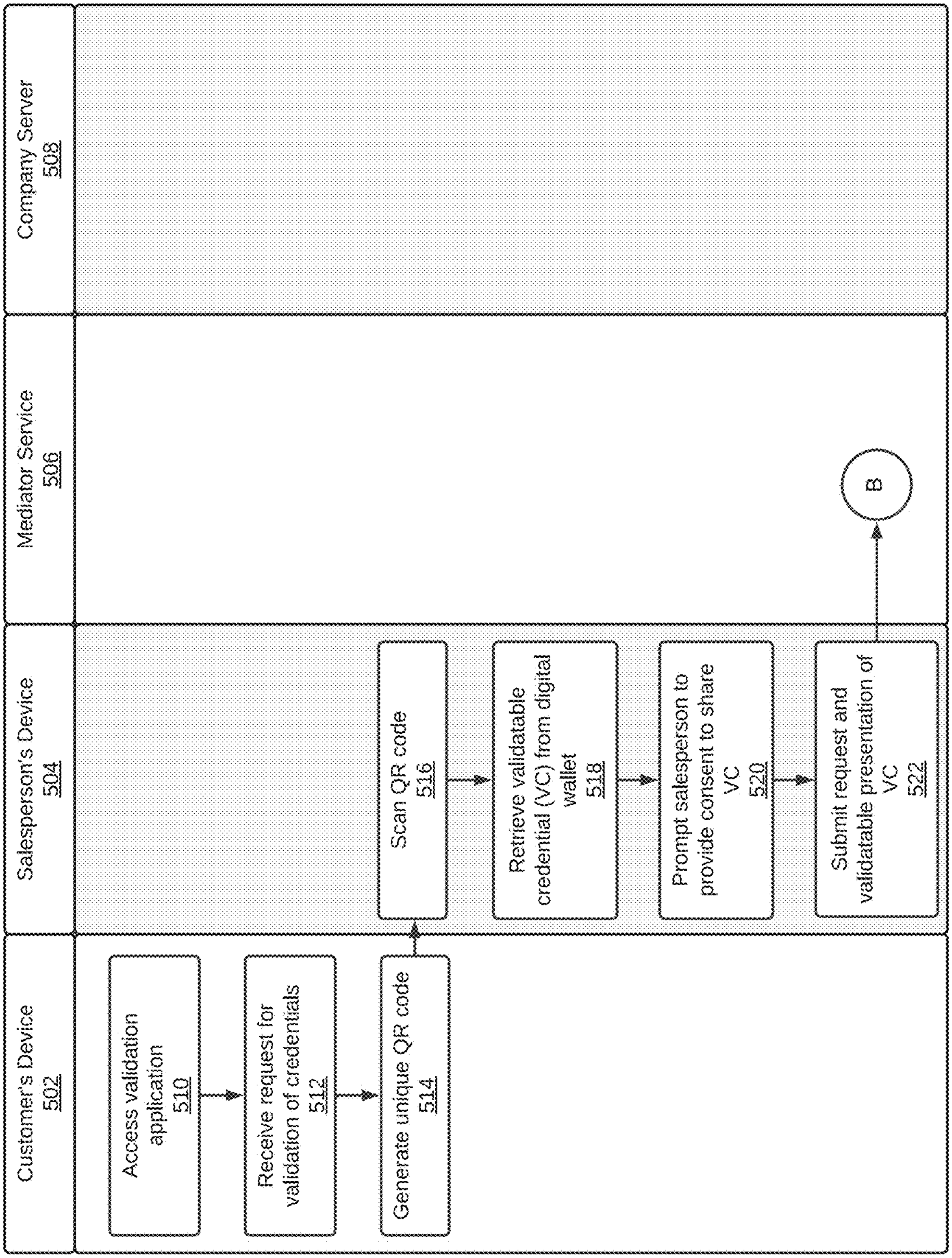
FIGS. 5A and 5B illustrate a swim diagram of operations for validating credentials salesperson in accordance with one or more embodiments.
Figure 5B:
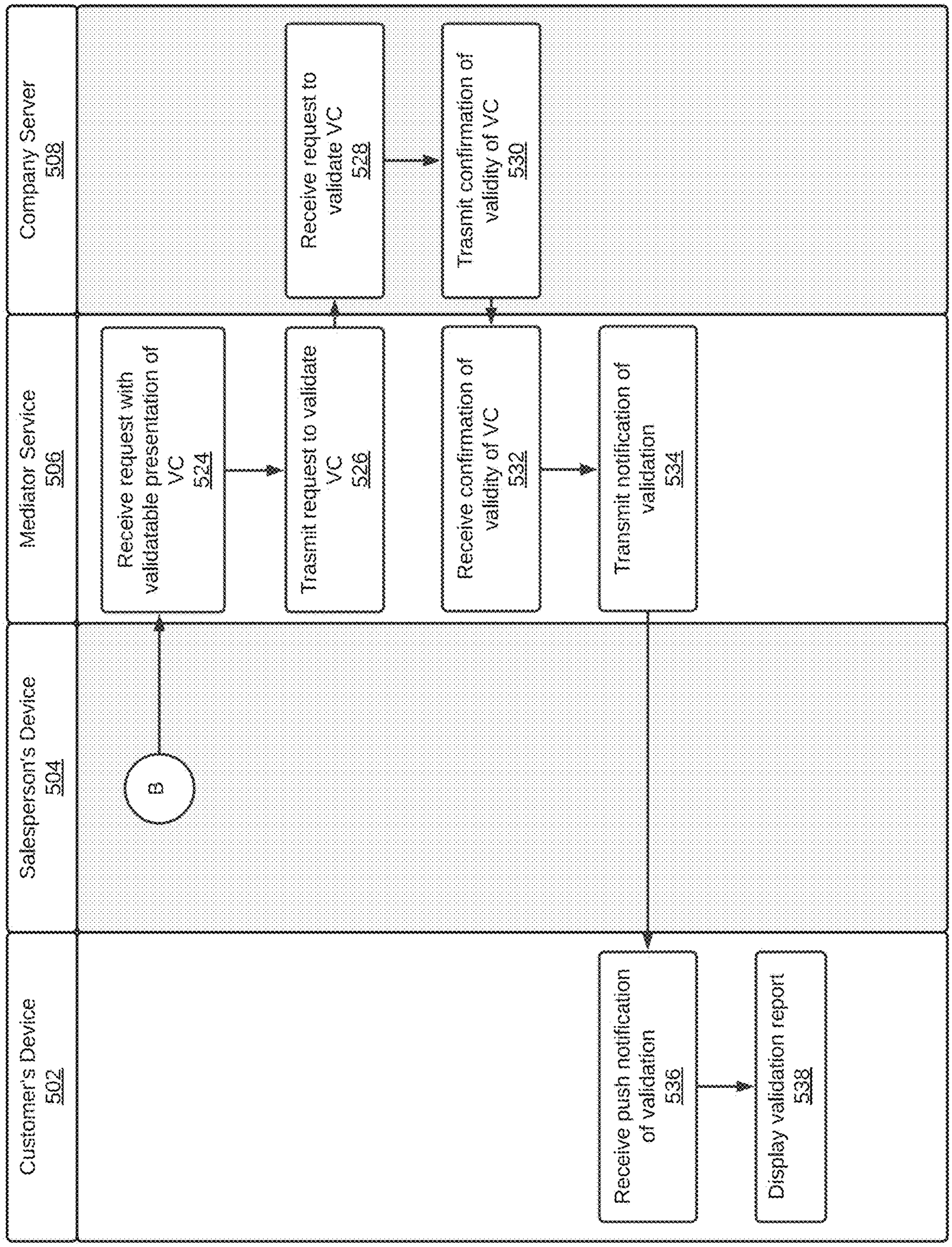

FIGS. 5A and 5B illustrate a swim diagram of an example process of validating credentials in accordance with one or more embodiments. In this example, the credential holder is a door-to-door salesperson, hereinafter referred to as salesperson. The credential issuer is the salesperson's employer. In the example, the salesperson approaches a potential customer, hereinafter referred to as customer, at the customer's residence. The salesperson claims to represent a company that sells and installs solar panels. Interactions between the salesperson and the customer are in person and in real-time.

To validate the credentials of the salesperson, i.e., to confirm that the salesperson is who they say they are, the customer uses a VC-based validation service. The customer accesses a validation application executing on the customer's device 502 (Operation 510). Using the validation application on the customer's device 502, the customer initiates a request for validation of the salesperson's credentials (Operation 512). The customer uses the validation application to provide details about the location from which the request is being made and the company the salesperson claims to represent. The customer provides the information by selecting a region from a list of regions provided in the validation application and by selecting the company from a list of companies and institutions provided in the validation application. The customer may also provide a type of credential being validated, e.g., employment status. Using the selection details and device details of the customer's device 502, the validation application generates a unique link, which in this example is a QR code (Operation 514).

The salesperson uses their device 504 to scan the QR code provided by the validation application on the customer's device 502 (Operation 516). Responsive to scanning the QR code, a validation application executing on the salesperson's device 504 retrieves the validatable credentials of the salesperson from a digital wallet of the salesperson's device 504 (Operation 518). Responsive to scanning the QR code, the validation application executing on the salesperson's device 504 may also prompt the salesperson to provide consent to share the validatable credentials (Operation 520). Responsive to receiving the salesperson's consent, the validation application submits the request and a validatable presentation of the validatable credentials to a mediator service 506 (Operation 522). The mediator service 506 receives the request from the validation application on the salesperson's device 504 (Operation 524) and transmits, to a server associated with the company server 508, a request to validate the validatable credentials provided by the salesperson (Operation 526).

The company server 508 receives the request to validate the salesperson's validatable credentials (Operation 528). A credential manager executing on the company server 508 validates the validatable credentials of the salesperson and transmits confirmation of the validity of the validatable credentials to the mediator service 506 (Operation 530). The mediator service 506 receives the confirmation of the validity of the validatable credentials (Operation 532). The mediator service 506 then transmits, to the customer's device 502, a notification of the validation of the salesperson's validatable credentials (Operation 534). The mediator service 506 transmits the notification using a push notification. The push notification includes a validation report that indicates the credentials of the salesperson are valid. The validation report may also describe one or more privileges assigned to the salesperson.

The customer's device 502 receives the push notification from the mediator service 506 (Operation 536). The validation application on the customer's device 502 displays the validation report in a GUI of the customer's device 502 (Operation 538). The customer may view the validation report in the GUI.

After reviewing the validation report and receiving confirmation that the salesperson is who they say they are, the customer may choose to continue interacting with the salesperson. In the event the salesperson's credentials are not valid, the customer may stop interacting with the salesperson.

8. PRACTICAL APPLICATIONS, ADVANTAGES & IMPROVEMENTS

One or more embodiments provide a technical solution to the technical problem of validating credentials when physical copies of the credentials are not readily available, not fully trusted, and/or otherwise unsuitable. Digital credentials as described herein are secure, efficient, and resilient against scams and fraud. In addition, real-time credential validation improves security by reducing the amount of time during which the validity of an individual's credentials is unknown. Moreover, one or more embodiments use an application that can be installed on user devices rather than requiring users to purchase dedicated devices. Similarly, the unique link followed by the credential holder may be of a sort that is readily accessible on a variety of devices (e.g., a QR code that links to a website). Thus, one or more embodiments provide a technical solution to the technical problem of making credential validation readily available in a range of contexts and technical environments, for users with a range of technical competencies (e.g., a private home, a business, a government facility, etc.).

One or more embodiments provide a secure and consistent authentication process. One or more embodiments enhance security, unify credential management, provide real-time notification and validation, permit cross-organization efficiency, reduce the potential for scams, and provide a global credential trust network. Cryptographic protection ensures that credentials are tamper-proof and validated in real-time, reducing the risk of identity fraud.

One or more embodiments reconcile organizational identity stores with decentralized identities, allowing for efficient issuance, validation, and revocation of credentials across platforms. The ability to notify end users directly when credentials are being validated or when identity spoofing is detected ensures transparency and prevents fraud. A mediator service bridges the gap between organizations, allowing for smooth credential management and validation even across decentralized systems. By validating the legitimacy of individuals in real-time and allowing organizations to notify users about validated employees, the mediator service mitigates the risk of impersonation scams. The mediator service provides a unified platform where entities such as universities, organizations, and governments can securely validate credentials, building trust across borders.

In one or more embodiments, AI-driven analysis of credential usage assists in preventing fraud by identifying suspicious activity patterns in real-time. Anomalies like geographic inconsistency, unusual device use, or rapid consecutive access attempts can be quickly flagged. Using machine learning, the system evolves based on ongoing usage data, becoming more efficient at detecting abnormal behaviors as it learns from legitimate and fraudulent patterns. Timely alerts to both the credential holder and the issuing organization help ensure that security actions can be taken quickly, potentially revoking compromised credentials before they are misused. The mediator service provides organizations and individuals with an early warning system for potential cyber scams or identity fraud, reducing the time attackers have to exploit stolen or duplicated credentials. One or more embodiments are highly adaptable and can handle credential validation across different regions, organizations, and platforms, offering comprehensive protection in a world with increasingly mobile and distributed workforces.

9. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 6:
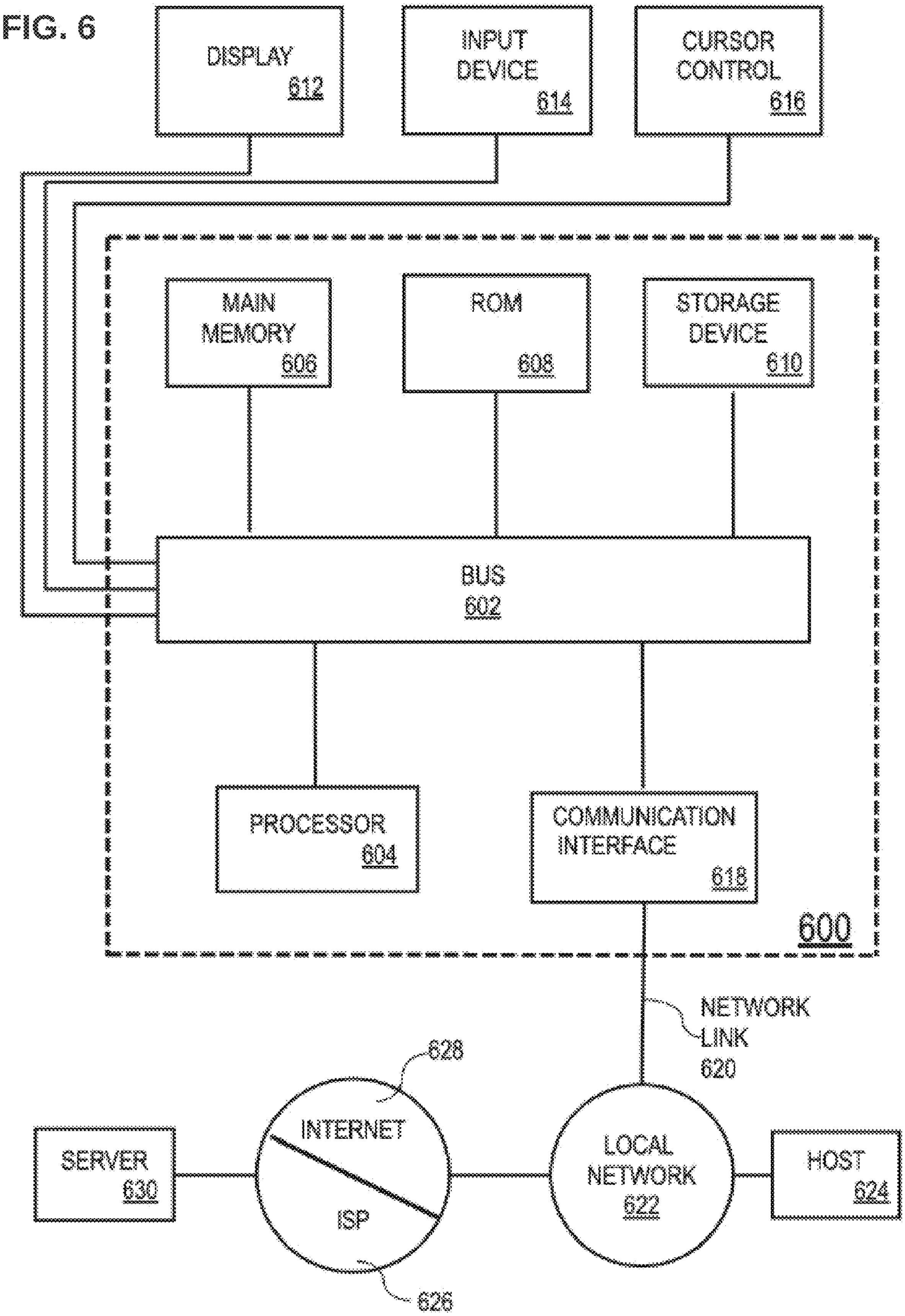
FIG. 6 shows a block diagram that illustrates a computer system in accordance with one or more embodiments.

For example, FIG. 6 is a block diagram that illustrates a computer system 600 upon which an embodiment of the disclosure may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or a Solid State Drive (SSD) is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

10. MISCELLANEOUS; EXTENSIONS

Unless otherwise defined, all terms (including technical and scientific terms) are to be given their ordinary and customary meaning to a person of ordinary skill in the art, and are not to be limited to a special or customized meaning unless expressly so defined herein.

This application may include references to certain trademarks. Although the use of trademarks is permissible in patent applications, the proprietary nature of the marks should be respected, and every effort made to prevent their use in any manner which might adversely affect their validity as trademarks.

Embodiments are directed to a system with one or more devices that include a hardware processor and that are configured to perform any of the operations described herein and/or recited in any of the claims below.

In an embodiment, one or more non-transitory computer readable storage media comprises instructions which, when executed by one or more hardware processors, cause performance of any of the operations described herein and/or recited in any of the claims.

In an embodiment, a method comprises operations described herein and/or recited in any of the claims, the method being executed by at least one device including a hardware processor.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A method comprising:

receiving, by a credential mediator service, via a unique link from a first device under control of a first individual, a first request to validate a verifiable credential (VC) that associates the first individual with an organization;

wherein the organization is one of a plurality of organizations for which the credential mediator service issues and validates VCs; and wherein the first device obtains the unique link from a second device under control of a second individual seeking to determine if the first individual is verifiably associated with the organization;

responsive to receiving the first request, validating the VC at least by:

transmitting, by the credential mediator service to a first endpoint associated with the organization, a second request to determine if the VC is valid; and receiving, by the credential mediator service responsive to the second request, a first message indicating if the VC is valid; and transmitting, to one or both of the first device and the second device, a second message indicating if the first individual is verifiably associated with the organization;

wherein the method is performed by at least one device including a hardware processor.

2. The method of claim 1, further comprising:

receiving, by a second endpoint of the credential mediator service, a third request to issue the VC that associates the first individual with the organization; and responsive to receiving the third request:

generating, by the credential mediator service, the VC; and storing, by the credential mediator service, the VC in a digital wallet associated with the first individual.

3. The method of claim 2, further comprising:

responsive to receiving the third request: accessing, by the credential mediator service, an organization-specific identity store that (a) is under control of the credential mediator service and (b) comprises a credential schema and one or more user attributes associated with the organization;

performing, by the credential mediator service, a reconciliation of the credential schema and one or more user attributes with identity data provided by the organization;

wherein generating the VC is performed responsive to determining that the reconciliation was successful.

4. The method of claim 1:

wherein the first message indicates that the VC is not valid; and wherein the second message indicates that the first individual is not verifiably associated with the organization.

5. The method of claim 4, wherein the first message indicates that the VC is revoked or suspended.

6. The method of claim 1, further comprising:

applying, by the credential mediator service while validating the VC, an anomaly detection model to one or more of:

a geographic location of the first device;

a current time of day; or a device identifier associated with the first device.

7. The method of claim 1, further comprising:

transmitting, by the credential mediator service to a credential validation application executing on the second device, a plurality of credential request options comprising one or more of:

a first list of the plurality of organizations; or a second list of credential types;

wherein the credential validation application (a) receives user input from the second individual that selects one or more options from the plurality of credential request options and (b) generates the unique link based at least in part on the one or more options selected by the second individual.

8. One or more non-transitory computer readable media comprising instructions which, when executed by one or more hardware processors, cause performance of operations comprising:

receiving, by a credential mediator service, via a unique link from a first device under control of a first individual, a first request to validate a verifiable credential (VC) that associates the first individual with an organization;

wherein the organization is one of a plurality of organizations for which the credential mediator service issues and validates VCs; and wherein the first device obtains the unique link from a second device under control of a second individual seeking to determine if the first individual is verifiably associated with the organization;

responsive to receiving the first request, validating the VC at least by:

transmitting, by the credential mediator service to a first endpoint associated with the organization, a second request to determine if the VC is valid; and receiving, by the credential mediator service responsive to the second request, a first message indicating if the VC is valid; and transmitting, to one or both of the first device and the second device, a second message indicating if the first individual is verifiably associated with the organization.

9. The non-transitory computer readable media of claim 8, further comprising:

receiving, by a second endpoint of the credential mediator service, a third request to issue the VC that associates the first individual with the organization; and responsive to receiving the third request:

generating, by the credential mediator service, the VC; and storing, by the credential mediator service, the VC in a digital wallet associated with the first individual.

10. The non-transitory computer readable media of claim 9, further comprising:

responsive to receiving the third request: accessing, by the credential mediator service, an organization-specific identity store that (a) is under control of the credential mediator service and (b) comprises a credential schema and one or more user attributes associated with the organization;

performing, by the credential mediator service, a reconciliation of the credential schema and one or more user attributes with identity data provided by the organization;

wherein generating the VC is performed responsive to determining that the reconciliation was successful.

11. The non-transitory computer readable media of claim 8, wherein the first message indicates that the VC is not valid; and wherein the second message indicates that the first individual is not verifiably associated with the organization.

12. The non-transitory computer readable media of claim 11, wherein the first message indicates that the VC is revoked or suspended.

13. The non-transitory computer readable media of claim 8, further comprising:

applying, by the credential mediator service while validating the VC, an anomaly detection model to one or more of:

a geographic location of the first device;

a current time of day; or a device identifier associated with the first device.

14. The one or more non-transitory computer readable media of claim 8, further comprising:

transmitting, by the credential mediator service to a credential validation application executing on the second device, a plurality of credential request options comprising one or more of:

a first list of the plurality of organizations; or a second list of credential types;

wherein the credential validation application (a) receives user input from the second individual that selects one or more options from the plurality of credential request options and (b) generates the unique link based at least in part on the one or more options selected by the second individual.

15. A system comprising:

at least one device including a hardware processor;

the system being configured to perform operations comprising:

receiving, by a credential mediator service, via a unique link from a first device under control of a first individual, a first request to validate a verifiable credential (VC) that associates the first individual with an organization;

wherein the organization is one of a plurality of organizations for which the credential mediator service issues and validates VCs; and wherein the first device obtains the unique link from a second device under control of a second individual seeking to determine if the first individual is verifiably associated with the organization;

responsive to receiving the first request, validating the VC at least by:

transmitting, by the credential mediator service to a first endpoint associated with the organization, a second request to determine if the VC is valid; and receiving, by the credential mediator service responsive to the second request, a first message indicating if the VC is valid; and transmitting, to one or both of the first device and the second device, a second message indicating if the first individual is verifiably associated with the organization.

16. The system of claim 15, further comprising:

receiving, by a second endpoint of the credential mediator service, a third request to issue the VC that associates the first individual with the organization; and responsive to receiving the third request:

generating, by the credential mediator service, the VC; and storing, by the credential mediator service, the VC in a digital wallet associated with the first individual.

17. The system of claim 16, further comprising:

responsive to receiving the third request: accessing, by the credential mediator service, an organization-specific identity store that (a) is under control of the credential mediator service and (b) comprises a credential schema and one or more user attributes associated with the organization;

performing, by the credential mediator service, a reconciliation of the credential schema and one or more user attributes with identity data provided by the organization;

wherein generating the VC is performed responsive to determining that the reconciliation was successful.

18. The system of claim 15, wherein the first message indicates that the VC is not valid; and wherein the second message indicates that the first individual is not verifiably associated with the organization.

19. The system of claim 15, wherein the first message indicates that the VC is revoked or suspended.

20. The system of claim 15, further comprising:

applying, by the credential mediator service while validating the VC, an anomaly detection model to one or more of:

a geographic location of the first device;

a current time of day; or a device identifier associated with the first device.

* * * * *